(12) United States Patent
Seino et al.

(10) Patent No.: US 7,977,647 B2
(45) Date of Patent: *Jul. 12, 2011

(54) RADIOLOGICAL IMAGING APPARATUS

(75) Inventors: Tomoyuki Seino, Hitachi (JP);
Yuuichirou Ueno, Hitachi (JP);
Katsutoshi Tsuchiya, Hitachi (JP);
Kazuma Yokoi, Hitachi (JP); Shinya Kominami, Okinawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/398,752

(22) Filed: Mar. 5, 2009

(65) Prior Publication Data

US 2009/0194701 A1 Aug. 6, 2009

Related U.S. Application Data

(63) Continuation of application No. 11/316,966, filed on Dec. 27, 2005, now Pat. No. 7,514,689.

(30) Foreign Application Priority Data

Dec. 28, 2004 (JP) ................. 2004-378584

(51) Int. Cl.
*H01L 27/146* (2006.01)
*H01L 27/24* (2006.01)
*G01T 1/24* (2006.01)
(52) U.S. Cl. ........... 250/370.13; 250/336.1; 250/370.07; 250/370.01
(58) Field of Classification Search ............. 250/370.13, 250/336.1, 370.01, 370.02, 370.06, 370.07, 250/370.08, 371
See application file for complete search history.

(56) References Cited

U.S. PATENT DOCUMENTS

| 4,243,885 | A | * | 1/1981 | Agouridis et al. ....... 250/370.07 |
| 4,255,659 | A | | 3/1981 | Kaufman et al. |
| 4,415,237 | A | * | 11/1983 | Fox ........................ 250/370.07 |
| 4,454,423 | A | * | 6/1984 | Koob ............................ 250/374 |
| 6,282,264 | B1 | | 8/2001 | Smith et al. |

(Continued)

FOREIGN PATENT DOCUMENTS

JP 6-121793 A 5/1994

(Continued)

OTHER PUBLICATIONS

Bell et al., "Time-Dependent Polarization of CdTe Gamma-Ray Detectors", Nuclear Instruments and Methods, vol. 117, May 1, 1974, pp. 267-271.

(Continued)

*Primary Examiner* — David P Porta
*Assistant Examiner* — Jessica L Eley
(74) *Attorney, Agent, or Firm* — Dickstein Shapiro LLP

(57) ABSTRACT

A radiological imaging apparatus using a semiconductor radiation detector to make it possible to reduce a radiation measurement off time that may result from an attempt to avoid polarization, the radiological imaging apparatus comprising a capacitor that applies a voltage to a semiconductor radiation detector that detects a radiation from a subject, first current regulated means for conducting a charge current to the capacitor, and second current regulated means for conducting a discharge current from the capacitor, or comprising a capacitor that applies a voltage to the semiconductor radiation detector, a first resistor that conducts a charge current to and a discharge current from the capacitor, and a second resistor connected in parallel with the first resistor to subject the capacitor to charging and discharging.

22 Claims, 11 Drawing Sheets

U.S. PATENT DOCUMENTS

| | | |
|---|---|---|
| 6,346,706 B1 | 2/2002 | Rogers et al. |
| 6,525,305 B2 | 2/2003 | Deschamps et al. |
| 7,157,716 B2 | 1/2007 | Kitaguchi et al. |
| 7,297,955 B2 | 11/2007 | Amemiya et al. |
| 2002/0113211 A1* | 8/2002 | Nygard et al. .............. 250/336.1 |
| 2003/0076920 A1 | 4/2003 | Shinno et al. |
| 2005/0067577 A1 | 3/2005 | Yanagita et al. |

FOREIGN PATENT DOCUMENTS

| | | |
|---|---|---|
| JP | 6-138241 A | 5/1994 |
| JP | 7-12947 A | 1/1995 |
| JP | 11149320 | 2/1999 |
| JP | 11/149320 | 6/1999 |
| JP | 3151487 | 1/2001 |
| JP | 2003-232855 A | 8/2003 |
| JP | 2004-125524 A | 4/2004 |
| WO | WO 03/019215 A2 | 3/2003 |
| WO | WO 2004055550 A1 | 7/2004 |

OTHER PUBLICATIONS

Siffert et al., "Polarization in Cadmium Telluride Nuclear Radiation Detectors", IEEE Transactions on Nuclear Science, vol. 23, No. 1, Feb. 1, 1976, pp. 159-170.

Radiation Measurement handbook, 3rd Edition, the Nikkan Kogyo Shinbun Ltd., p. 548, dated Mar. 27, 2001.

EEs' Tools & Toys, Riezenman, M.J., Spectrum, IEEE, vol. 32, Issue 12, Dec. 1995, pp. 60, Digital Object Identifier, 1995.

* cited by examiner

RADIOLOGICAL IMAGING APPARATUS

CROSS-REFERENCE TO RELATED APPLICATIONS

This application is a continuation of U.S. patent application Ser. No. 11/316,966, filed on Dec. 27, 2005, now U.S. Pat. No. 7,514,689 the subject matter of which is incorporated in its entirety by reference herein.

BACKGROUND OF THE INVENTION

The present invention relates to a radiological imaging apparatus comprising semiconductor radiation detector modules.

Examples of medically applied radiation measurement systems include radiological imaging apparatuses such as a gamma camera, a single photon emission computed tomography (SPECT) apparatus, and a positron emission tomography (PET) apparatus.

In examinations using a radiological imaging apparatus, radiopharmaceuticals are administered to a subject that is a testing object; the radiopharmaceuticals contains a substance tending to deposit in a particular site (for example, cancerous cells). Then, radiation detectors detect radiations emanated from the subject's affected part as a result of the radiopharmaceuticals deposited in the site. The radiations emanated from the subject's affected part each have a fixed quantity of energy (for PET examinations, 511-KeV energy). On the basis of detection signals output by the radiation detectors having detected the radiations, the radiological imaging apparatus creates a tomographic image containing an image of the area in which the radiopharmaceuticals are deposited, that is, an image of the subject's cancerous part. On the basis of the created tomographic image, a medical doctor specifies a cancerous part.

A radiological imaging apparatus is known which uses semiconductor radiation detectors (referred to as semiconductor detectors below) as radiation detectors (see JP-A-2004-125524). The semiconductor detector is composed of any one of semiconductor materials such as CdTe (cadmium telluride), GaAs (gallium arsenide), and TlBr (thallium bromide). The semiconductor detector has electrodes installed on opposite surfaces of the semiconductor member. When a radiation is incident on the semiconductor member, the semiconductor detector generates electric charges corresponding to the energy of the radiation on the basis of photoelectricity. The electric charges generated by the semiconductor member are taken out of an electrode to which a charge collection bias voltage is applied. As a result, an electric signal is obtained. Thus, the semiconductor detector outputs the electric charges generated by the interaction between the radiation and the semiconductor material, as an electric signal. The semiconductor detector thus has an excellent energy resolution.

However, if the semiconductor detector is applied to the radiological imaging apparatus, measures must be taken for a phenomenon called polarization. The polarization appears significantly in semiconductor detectors using CdTe Schottky diodes. This phenomenon will be described. Continuous application of a bias (a reverse bias for normal diodes) voltage to the CdTe Schottky diode may degrade the energy resolution in several to several tens of minutes. Further elapse of time may degrade detection efficiency or photoelectric conversion efficiency. In this state, accurate measurements are impossible. The polarization results from the accumulation of space charges as shown in "Radiation Measurement Handbook, 3rd Edition written by KNOLL and translated by Itsuro KIMURA and Eiji SAKAI, THE NIKKAN KOGYO SHIMBUN LTD., p. 548". Thus, when the bias voltage is zeroed simultaneously with the end of measurements, the space charges are recombined to avoid the polarization (see JP-A-2004-125524).

JP-A-2004-125524 describes a radiation detection system comprising a semiconductor detector, a switch and a control unit. JP-A-2004-125524 also discloses a technique for zeroing the bias voltage applied to the radiation detector after detection of a radiation in order to avoid the polarization.

However, while the bias voltage applied to the radiation detector is zero, the electric charges generated by the radiation detector are not collected. Consequently, gamma rays cannot be measured. Some examinations using a radiological imaging apparatus measure gamma rays emanated from the subject's body to check variations in the gamma rays according to time series. Such examinations are intended for the brain (cerebral infarction, brain tumor, or Alzheimer's disease) and the heart and vessels (myocardial infarction or myocardial ischemia).

Cardiac examinations use, for example, radiopharmaceuticals which are taken and deposited in the normal heart muscle and which are not deposited in a site of the myocardial infarction. Before PET examinations, such radiopharmaceuticals are administered to the subject. A PET apparatus measures gamma rays emanated from the subject's heart muscle to create a tomographic image containing the heart. To create a tomographic image, it is necessary to measure time series data on radiations emanated from the normal parts of the heart and adapt a time-radiation curve for the left chamber lumen and the heart muscle to a compartment model analysis method to determine the blood flow in the local heart muscle. If such time series data is measured, an off time during the gamma ray measurement must be reduced.

SUMMARY OF THE INVENTION

It is an object of the present invention to reduce the off time during radiation measurement which may result from an attempt to avoid polarization.

To achieve the object, a first invention provides a radiological imaging apparatus using a semiconductor radiation detector that detects a radiation from a subject, the apparatus being characterized by comprising a capacitor that applies a voltage to the detector, first current regulating means for conducting a charge current to the capacitor, and second current regulating means for conducting a discharge current from the capacitor.

To achieve the object, a second invention provides a radiological imaging apparatus using a semiconductor radiation detector that detects a radiation from a subject, the apparatus being characterized by comprising a capacitor that applies a voltage to the detector, a first resistor that conducts a charge current to and a discharge current from the capacitor, and a second resistor connected in parallel with the first resistor to charge and discharge the capacitor.

The present invention reduces the off time during radiation measurement which may result from an attempt to avoid polarization.

Other objects, features and advantages of the invention will become apparent from the following description of the embodiments of the invention taken in conjunction with the accompanying drawings.

DETAILED DESCRIPTION OF THE INVENTION

Embodiments will be described below with reference to the drawings.

With reference to FIGS. 1, 2, 9, and 10, description will be given of a radiological imaging apparatus in accordance with a preferred embodiment of the present invention. The radiological imaging apparatus in accordance with the present embodiment will be described taking the case of a PET apparatus 90 comprising a radiation detector (referred to as a semiconductor detector below) using CdTe as a semiconductor member.

Figure 9:
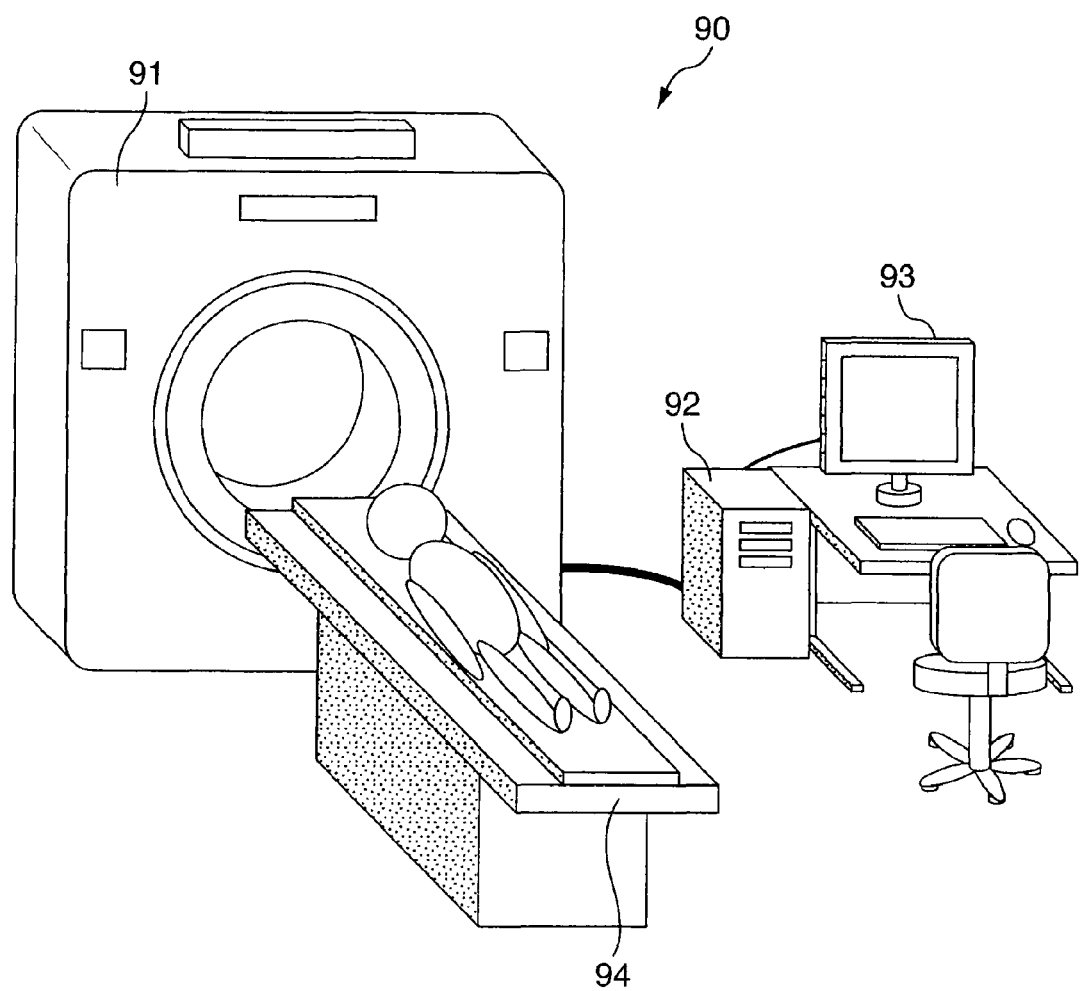
FIG. 9 is a diagram showing the configuration of a PET apparatus in accordance with a preferred embodiment of the present invention.

As shown in FIG. 9, the PET apparatus 90 includes a camera (imaging system) 91, a data processing system (data accumulation system) 92, a display system 93, and a bed 94.

Figure 10:
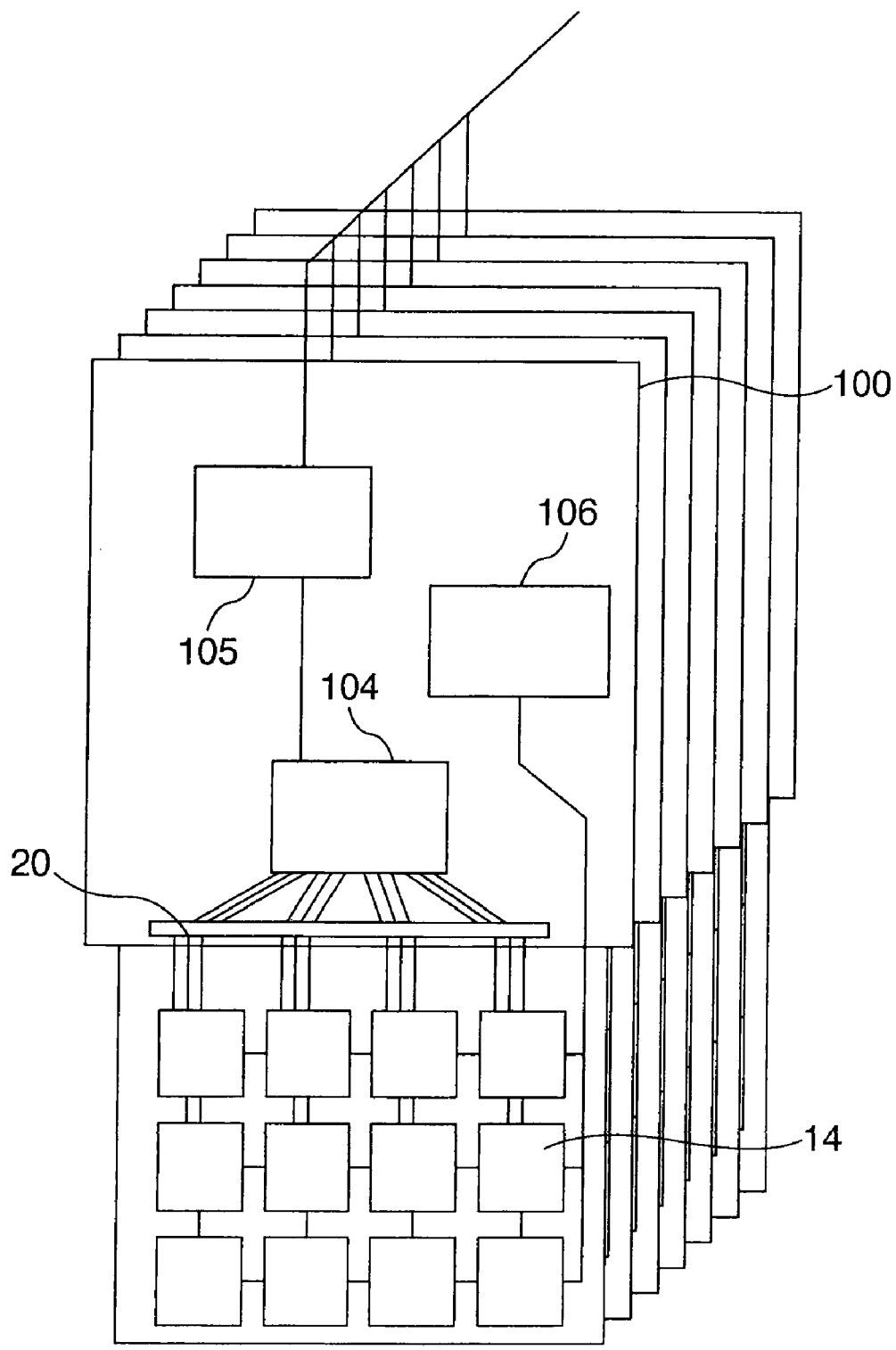
FIG. 10 is a diagram showing the configuration of a connecting board installed in the camera shown in FIG. 9.

A plurality of connecting boards 100 shown in FIG. 10 are installed in the camera 91 so as to surround a bed 94. Each of the connecting boards 100 has a plurality of semiconductor detectors 14, a coupling capacitor 20, a bleeder resistor 19 (see FIG. 1), an analog ASIC 104, a digital ASIC 105, and a bias application circuit 106a. In the connecting board 100, each of the semiconductor detectors 14, placed closer to the bed 94, has a semiconductor member (for example, CdTe). A cathode and an anode are provided on respective surfaces facing each other of the semiconductor member. The semiconductor member may be GaAs or TlBr. The plurality of semiconductor detectors 14 are connected to the coupling capacitor 20. The coupling capacitor 20 is connected to an amplifier 21 installed in the analog ASIC 104 (see FIG. 1). The digital ASIC 105 receives a signal from the analog ASIC 104 and outputs the signal to the data processing unit 92. The bias application circuit 106a is connected to an electrode of each of the semiconductor detectors 14, provided on the connecting board 100. One terminal of the bleeder resistor 19 is connected to the electrodes of the semiconductors detector 14 and to a wire connecting the coupling capacitor 20. The other terminal of the bleeder resistor 19 is connected to a ground line.

The data processing unit 92 has a coincidence detection system (not shown), a storage unit (not shown), and a tomographic image information creation system (not shown).

The bias application circuit 106a will be described with reference to FIG. 1. The bias application circuit 106a has a power source 11, a protective resistor 12, a filter capacitor 13, current regulated diodes 15 and 16, a photo MOS relay 17, and a switch control unit 18. The power source 11, the protective resistor 12, the current regulated diode 15, and the current regulated diode 16 are connected together in this order by wiring; the current regulated diode 15 is installed in a forward direction, and the current regulated diode 16 is installed in a reverse direction. The current regulated diode 16 is connected to one electrode of each semiconductor detector 14 by wiring. One terminal of the filter capacitor 13 is connected to a wire connecting the current regulated diode 16 and the electrode of each semiconductor detector 14. The photo MOS relay 17 has an input end connected to a wire connecting the current regulated diode 15 and the current regulated diode 16 together. An output end of the photo MOS relay 17 is grounded. The switch control unit 18 is connected to the photo MOS relay 17 to controllably open and close the photo MOS relay 17. The terminals of the filter capacitor 13 and photo MOS relay 17 are connected to the ground line.

The number of current regulated diodes 15 and 16 contained in the bias application circuit 106a is determined depending on the bias voltage applied to between the cathode and anode of each semiconductor detector 14. For example, it is assumed that the bias voltage applied to between the electrodes of each semiconductor detector 14 is 500 V and that the maximum voltage of each of the current regulated diodes 15 and 16 is 100 V. Then, six current regulated diodes 15 are connected in series in the forward direction. At least four current regulated diodes 16 are connected in series in the reverse direction. FIG. 1 shows only one current regulated diode 15 and only one current regulated diode 16. However, actually, six current regulated diodes 15 and 16 are connected in series, and six current regulated diodes 16 are connected in series.

The present embodiment will be described taking the case of examinations of the subject's heart (for example, examinations of heart muscle blood flow).

Before PET examinations, PET pharmaceuticals (for example, $^{13}$N-ammonia) are administered through an injection to a subject that is a testing object. The $^{13}$N-ammonia administered to the subject is taken into the subject's heart muscle. An amount of $^{13}$N-ammonia proportional to the heart muscle blood flow is fixed in the heart muscle cells. The subject to which the PET pharmaceuticals have been administered lies on the bed 39.

To start PET examinations, an operator operates a button provided on an operator console (not shown) to output an examination start signal to an integral control section (not shown). When the examination start signal is input, the integral control section outputs information on the range of examinations made on the subject as well as a bed movement start signal, to a bed movement control section (not shown). The bed movement control section, to which the bed movement start signal has been input, moves the bed so that a gamma ray detection region of the PET apparatus 90 covers the subject's heart, the subject's examination target range. In this state PET examinations starts.

The body of the subject, lying on the bed 39, emanates many pairs of rays resulting from the PET pharmaceuticals, in all the directions. The camera 91 contains a large number of semiconductor detectors 14, which detect the rays emanated from the subject's body. A charge collection bias voltage (for example, 500 V) is applied to between the cathode and anode of each semiconductor detector 14. The bias voltage is provided by the bias application circuit 106a. When a gamma ray is incident on the semiconductor detector 14 to which the bias voltage has been applied, interaction occurs between the incident gamma ray and the semiconductor member constituting the semiconductor detector 14. Charges, that is, electrons and holes, are generated. In the present embodiment, the bias voltage applied to between the electrodes of the semiconductor detector 14 is 500 V. Six current regulated diodes 15 (maximum voltage: 100 V) arranged in the forward direction are connected together in series. Six current regulated diodes 16 (maximum voltage: 100 V) are connected together in series in the reverse direction. Application of a bias voltage causes the semiconductor detector 14 to output the generated electric charges as gamma ray detection signals. The gamma ray detection signals are input via the coupling capacitor 20 to the amplifier 21, installed in the analog ASIC 104. The bleeder resistor 19 functions to prevent electric charges from being continuously accumulated in the coupling capacitor 20.

On the basis of the gamma ray detection signals, the analog ASIC 104 generates timing signals that identify the times when the gamma rays were detected. The timing signals generated are transmitted to the digital ASIC 105. Further, the analog ASIC 104 generates gamma ray energy signals on the basis of the gamma ray detection signals. The analog ASIC 104 then transmits the generated gamma ray energy signals to the digital ASIC 105. On the basis of the timing signals, the digital ASIC 105 determines the times at which the gamma rays were detected to identify detector IDs (used to identify the semiconductor detectors 14). The digital ASIC 105 converts the gamma ray energy signals corresponding to the semiconductor detectors 14 with the detector IDs into digital signals. The digital ASIC 105 adds the gamma ray energy signals to the time information and detector IDs to generate packet data. The packet data, digital information including three types of information (time information, detector IDs, and gamma ray energy signals), is transmitted to the data processing unit 92.

The coincidence detection system of the data processing system 92 executes a coincidence detection process on the basis of the packet information transmitted by the digital ASIC 105. A pair of coincidentally detected gamma rays is counted as one. Then, the two semiconductor detectors 14 having detected the pair of gamma rays is identified on their basis of the detector IDs. The identified detector IDs are stored in the storage unit as detectors having detected a 511-KeV gamma ray. The tomographic image information creation system then creates tomographic image information on the basis of the identified detection positions. The tomographic image information is displayed on a display system 93.

Polarization may result from continuous application of a 500-V bias voltage to each semiconductor detector 14. To avoid the polarization, the bias voltage applied to the semiconductor detector 14 must be temporarily set at 1 V or lower. In the semiconductor detector 14 in accordance with the present embodiment, the voltage of 1 V is required to allow electrons and holes in the semiconductor member resulting from the polarization to be recombined to compensate for the polarization. Preferably, the voltage used to avoid the polarization reaches 0 V (this will be referred to as a reset voltage below). Further, to avoid the polarization, a certain amount of time must be ensured during which the bias voltage applied to the semiconductor detector 14 remains at 1 V or lower (this will be referred to as a reset time below). The required reset time depends on the time during which the charge collection voltage is continuously applied to the semiconductor detector 14. If the time for the application of the charge collection voltage is long, a long reset time is required. If the time for the application of the charge collection voltage is short, the polarization can be avoided using a short reset time. If, for example, a 500-V bias voltage is applied to the semiconductor detector 14 for three minutes, the reset time must be at least 0.2 seconds. Here, if the bias voltage applied to the semiconductor detector 14 is at most 99% of 500 V (in this case, at most 495 V), it is insufficient for the current connection bias voltage. Thus, the generated electric charges are not sufficiently taken out. As a result, the gamma ray measurement is interrupted (the time during which the measurement is interrupted will be referred to as an off time below). To obtain a local myocardial blood flow, it is important to minimize an off time during the measurement. The time is desirably minimized during which the bias voltage applied to the semiconductor detector 14 is at most 495 V. Thus, it is necessary to quickly set the bias voltage applied to the semiconductor detector 14 to at most 1 V, to ensure the reset time and then to quickly return the semiconductor detector 14 to the state in which the voltage of 500 V is applied.

Figure 1:
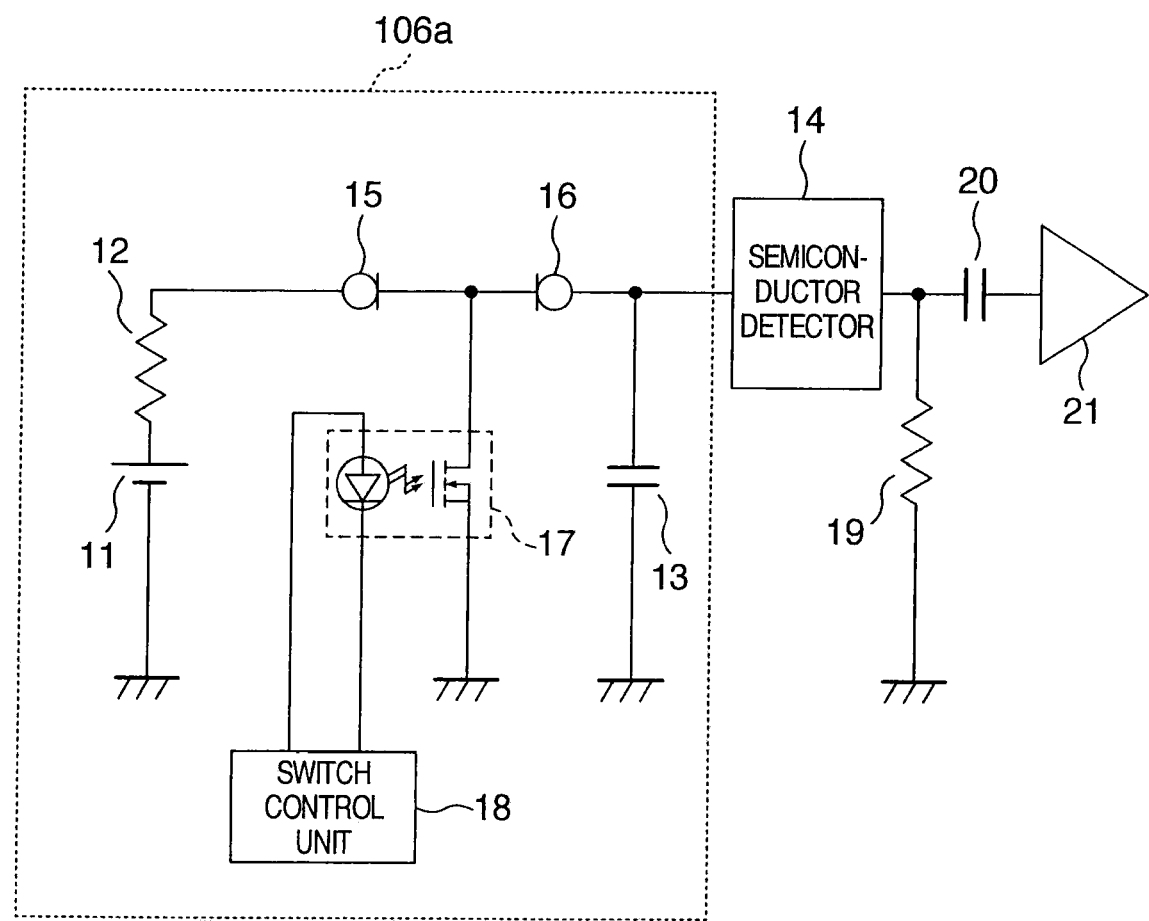
FIG. 1 is a circuit diagram showing a bias application circuit in a PET apparatus in accordance with a preferred embodiment of the present invention.
Figure 2:
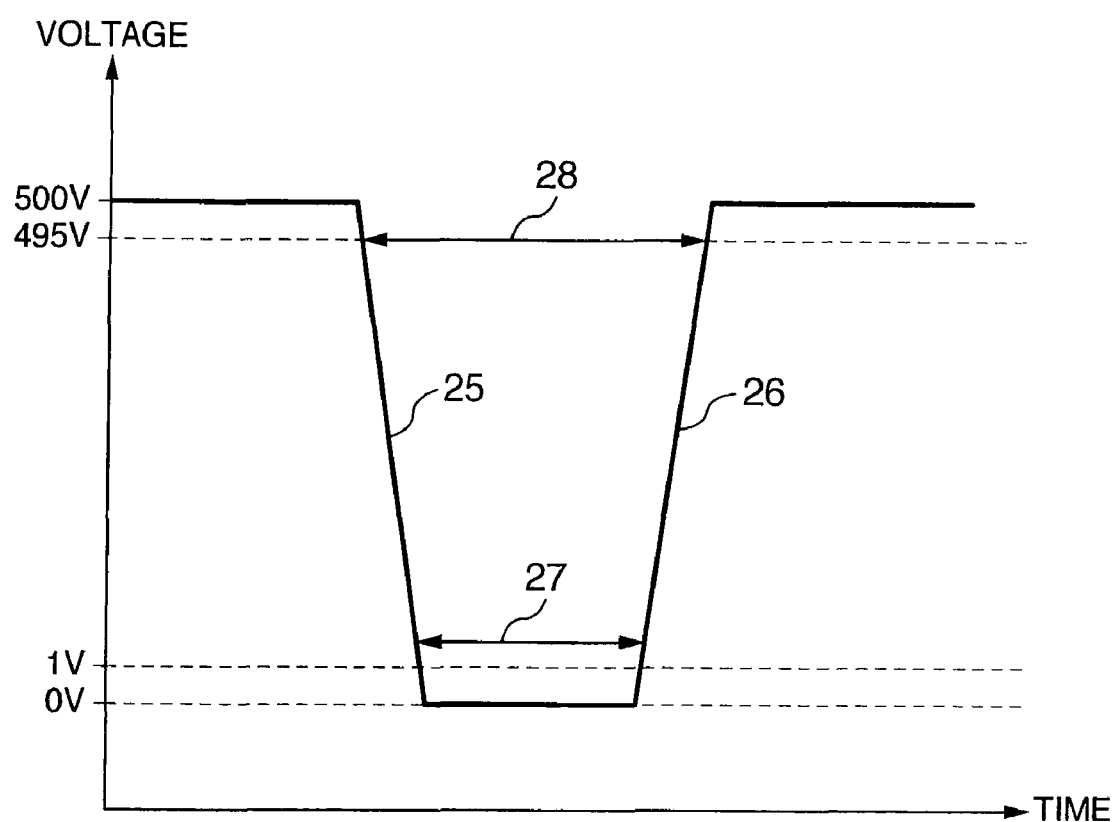
FIG. 2 is a graph showing a temporal change in a voltage applied to the semiconductor detector shown in FIG. 1.

With reference to FIGS. 1 and 2, description will be given of a control method for avoiding polarization according to the present embodiment. The power source 11 supplies a DC voltage. When the power source 11 applies a voltage of 500 V directly to the semiconductor detector 14, noise may occur. Accordingly, the filter capacitor 13 is used to apply a voltage to the semiconductor detector 14. That is, the bias voltage applied to the semiconductor detector 14 is substantially applied by the filter capacitor 13. To apply a bias voltage to the semiconductor detector 14, the switch control unit 18 opens the photo MOS relay 17 (photo MOS relay 17 is turned off). To stop applying the bias voltage to the semiconductor detector 14, the switch control unit 18 closes the photo MOS relay 17 (photo MOS relay 17 is turned on). During the measurement of gamma rays, the switch control unit 18 keeps the photo MOS relay 17 open. The filter capacitor 13 is charged via the current regulated diode 15. The voltage at the filter capacitor 13 thus becomes 500 V. Correspondingly, the bias voltage applied to the semiconductor detector 14 becomes 500 V. In contrast, when the photo MOS relay 17 is closed, the voltage at the filter capacitor 13 is discharged to the ground line connected to the photo MOS relay 17 via the current regulated diode 16. The voltage at the filter capacitor 13 is thus zeroed. Accordingly, the bias voltage applied to the semiconductor detector 14 is also zeroed. In the present embodiment, the filter capacitor 13 is subjected to charging or discharging to vary the bias voltage applied to the semiconductor detector 14.

On the basis of preset time information, the switch control unit 18 transmits an instruction signal to the photo MOS relay 17. On the basis of the instruction signal, the photo MOS relay 17 is opened (turned "off") and closed (turned "on"). For example, the case will be considered in which the photo MOS relay 17 is opened and then closed three minutes later and in which one second later, the photo MOS relay 17 is opened again. This time information is stores in a memory (not shown) of the switch control unit 18. Specifically, information indicating the following operation is stored in memory: an "open (off)" instruction signal is transmitted, and three minutes later, a "close (on)" instruction signal is transmitted, and one second later, an "open (off)" instruction signal is transmitted. On the basis of the information stored in the memory, the switch control unit 18 transmits the "open (off)" instruction signal to the photo MOS relay 17. Upon receiving the off instruction signal, the photo MOS relay 17 is opened and remains off until it receives the next "close (on)" instruction signal. On the basis of a built-in clock (not shown), the switch control unit 18 transmits the "off" instruction signal, and three minutes later, transmits the "open (off)" instruction signal to the photo MOS relay 17. Upon receiving the instruction signal, the photo MOS replay 17 is opened. Subsequently, the photo MOS relay 17 remains off until it receives the "close (on)" instruction signal. On the basis of the clock, when further one second passes, the switch control unit 18 transmits the "open (on)" instruction signal to the photo MOS relay 17. Upon receiving the on instruction signal, the photo MOS replay 17 is opened. On the basis of the information stored in the memory, the switch control unit 18 transmits repeatedly the instruction signals to the photo MOS relay 17. The photo MOS relay 17 is repeatedly opened and closed in accordance with the instruction signals.

Now, description will be given of the case in which the photo MOS relay 17 is opened and closed by the switch control unit 18 of the bias application circuit 106a and in which a bias voltage is applied to the semiconductor detector 14. Specifically, with reference to FIG. 2, description will be given of a temporal change in the bias voltage applied to the semiconductor detector 14. In the present embodiment, the capacitance of the filter capacitor 13 is 0.1 microfarad. The regulation current through the current regulated diodes 15 and 16 is 0.5 milliamperes. The capacitance of the coupling capacitor 20 is 1,000 picofarads. The regulation current value for the amplifier 21 is 10 microamperes. First, opening the photo MOS relay 17 causes the filter capacitor 13 to be charged via the current regulated diode 15. The bias voltage applied to the semiconductor detector 14 becomes 500 V. Closing the photo MOS relay 17 causes the electric charges accumulated in the filter capacitor 13 to flow to the ground potential via the current regulated diode 16. Then, 0.2 seconds later, the voltage at the filter 13 capacitor reaches 1 V or lower (for example, 0 V). That is, the voltage applied to the semiconductor detector 14 becomes 1 V or lower 0.2 seconds after the photo MOS relay 17 has been closed. During discharging from the filter capacitor 13, the current regulated diode 16 contributes a temporal change 25 in the bias voltage applied to the semiconductor detector 14; the bias voltage drops linearly to 1 V or lower in a short time. In this case, when the photo MOS relay 17 remains closed for 0.5 seconds, a reset time 27 (see FIG. 2) of 0.3 seconds is ensured. Then, the photo MOS relay 17 is opened to start charging the filter capacitor 13, and 0.1 second later, the voltage at the filter capacitor 13 reaches 500 V. The voltage applied to the semiconductor detector 14 reaches 500 V in 0.1 second after the start of the charging. During the charging of the filter capacitor 13, the current regulated diode 15 contributes to a temporal change 26 in the bias voltage applied to the semiconductor detector 14; the bias voltage rises linearly and reaches 500 V in a short time. As described above, a measurement off time 28 (see FIG. 2) is about 0.5 seconds. Subsequently, a bias voltage of 500 V is applied to the semiconductor detector 14 for three minutes. The resulting gamma rays are measured. Then, the photo MOS relay 17 is opened to start discharging from the filter capacitor 13.

As described above, the present embodiment uses the bias application circuit 106a. Then, after the charge collection voltage is applied to the semiconductor detector 14 for three minutes, the measurement off time can be sufficiently reduced while ensuring a reset time of 0.2 seconds or more.

In this case, when the filter capacitor 13 is subjected to charging and discharging, the operator must be careful to prevent a current of a value larger than the regulated current value (in the present embodiment, 10 microamperes) of the amplifier 21 from flowing through the amplifier 21. The amplifier 21 functions to amplify a weak pulse current that is a gamma ray detection signal from the semiconductor detector 14. A current flows through the amplifier 21, the current corresponding to a temporal change in the voltage at the filter capacitor 13 and the capacitance of the coupling capacitor 20. That is, if a large temporal change occurs in the voltage at the filter capacitor 13 (for example, the filter capacitor 13 is short-circuited), a current larger than the regulated one may flow through the amplifier 21, which may thus be damaged. Thus, if the filter capacitor 13 is subjected to charging and discharging, it is necessary to regulate a decrease rate and an increase rate which are temporal changes in the voltage at the filter capacitor 13 so that the rates do not exceed a specified value. In the present embodiment, the capacitance of the coupling capacitor 20 is 1,000 picofarads and the regulated current value of the amplifier 21 is 10 microamperes. Accordingly, it is necessary to regulate the decrease and increase rates for the temporal change in the voltage at the filter capacitor 13 so that the maximum rates do not exceed 10,000 V/sec.

In the present embodiment, when the filter capacitor 13 is subjected to discharging, a discharge current flows to the ground potential via the current regulated diode 16. The current regulated diode 16 functions to regulate the value of the discharge current so that the discharge current has a fixed value. Thus, the voltage across the filter capacitor 13 drops at an almost constant decrease rate (25 in FIG. 2), and 0.1 second later, the voltage of 500 V applied to the filter capacitor 13 becomes 0 V. During the discharge, a temporal change in the voltage at the filter capacitor 13 varies almost linearly. Accordingly, the maximum decrease rate, the maximum value for a temporal change in voltage, is 5,000 V/sec. Since the capacitance of the coupling capacitor 20 is 1,000 picofarads, the maximum current flowing through the amplifier 21 is 5 microamperes. This value is smaller than the regulated current value of the amplifier 21. Further, when the filter capacitor 13 is charged, the current regulated diode 15 regulates the value of the charge current so that the value does not exceed a specified one (in the present embodiment, 0.5 milliamperes). Consequently, the temporal change (26 in FIG. 2) in the voltage across the filter capacitor 13 is regulated so that the voltage rises at an almost constant rate.

In the present embodiment, the semiconductor member is CdTe but CdZnTe, GaAs, TlBr, $HgI_2$, or the like may be used.

A common charge and discharge circuit 83 (see FIG. 7) composed of the capacitor 13 and resistors 75 and 76 may be used as a bias application circuit installed in order to avoid polarization. The off time associated with the gamma ray measurement is determined which is observed if such a common charge and discharge circuit 83 is used. The off time determined is compared with that observed if the bias application circuit 106a in accordance with the present embodiment is used.

Figure 7:
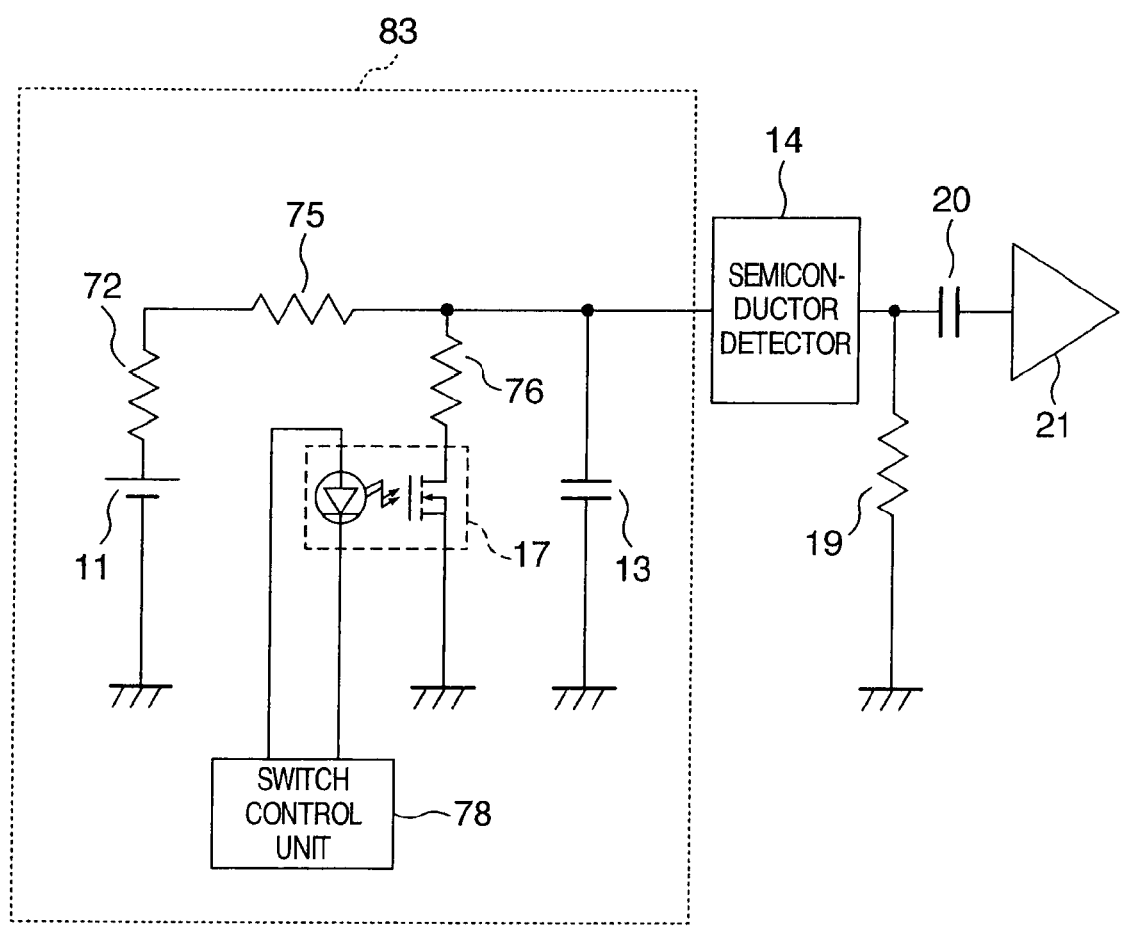
FIG. 7 is a circuit diagram showing a bias application circuit in accordance with a conventional example.

As shown in FIG. 7, the charge and discharge circuit 83 has the power source 11, a protective resistor 72, the filter capacitor 13, the resistors 75 and 76, the photo MOS relay 17, and a switch control unit 78. The power source 11 is connected to the semiconductor detector 14 via the resistors 75 and 76. A photo MOS relay 17A, a resistor 55, and the filter capacitor 13 are connected to the semiconductor detector 14. The switch control unit 78 is connected to the photo MOS relay 17 to controllably open and close the photo MOS relay 17. The operation of the switch control unit 78 is similar to that shown above and its description is thus omitted.

Figure 8:
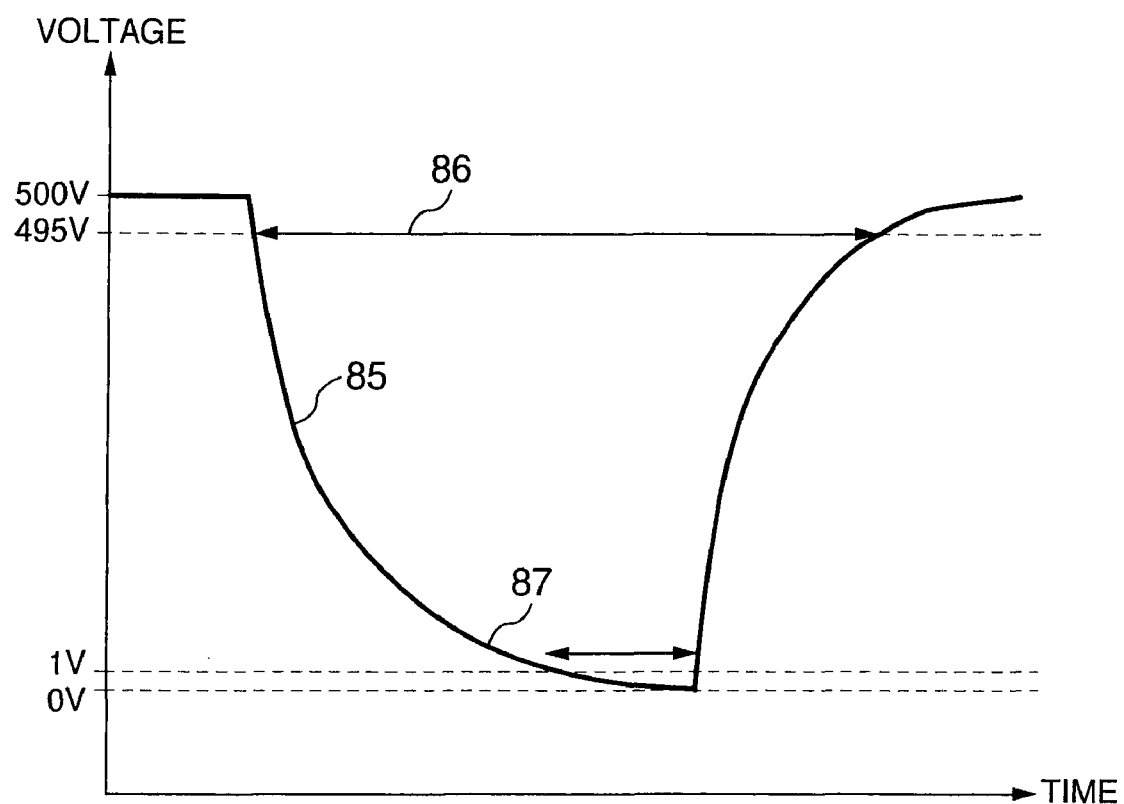
FIG. 8 is a graph showing a temporal change in a voltage applied to the semiconductor detector shown in FIG. 7.

With reference to FIG. 8, description will be given of a temporal change in the voltage applied to the semiconductor detector 14 which change occurs if the charge and discharge circuit 83 is used to apply a bias voltage to the semiconductor detector 14. The capacitance of the filter capacitor 13 is 0.1 microfarad. The resistance value of the resistor 76 is 1 megaohm. The capacitance of the coupling capacitor 20 is 1,000 picofarads. The regulated current value of the amplifier 21 is 10 microamperes. The synthetic resistance value of the resistors 72 and 75 is 1 megaohm. When the photo MOS relay 17 is open, the filter capacitor 13 is charged via the resistors 72 and 75. When the photo MOS relay 17 is closed, accumulated electric charges flow to the ground potential via the resistor 76 to subject the filter capacitor 13 to discharging. During discharging from the filter capacitor 13, the maximum value of a temporal change in voltage drop is 5,000 V/sec. However, the amount of electric charges accumulated in the filter capacitor 13 decreases over time. This gradually reduces the magnitude of a temporal change 85 in the voltage at the filter capacitor 13. Thus, after the start of the discharging, 0.62 seconds is required to set the voltage at the filter capacitor 13 to 1 V or lower. A reset time 87 of 0.2 seconds is provided and the photo MOS relay 17 is opened to start charging the filter capacitor 13. After the start of the charging, 0.46 seconds is required to set the voltage at the filter capacitor 13 to 495 V. As described above, the measurement off time 86 is 1.28 seconds, which exceeds the double of the off time observed if the bias application circuit 106a is used, that is, 0.5 seconds.

The present embodiment can exert the following effects.
(1) The present embodiment can reduce the measurement off time that may result from an attempt to avoid polarization. For cardiovascular examinations, this makes it possible to more accurately determine the local myocardial blood flow on the basis of time series data on gamma rays emanated by the subject. This improves the quality of myocardial blood flow images to enable the early diagnosis of the coronary artery sclerosis and the precise determination of functional severity of a coronary artery disease and effects of treatments. Further, for the diagnosis of a cancerous part, the present embodiment makes it possible to reduce the time required to examine the subject. This in turn reduces burdens on the subject, while increasing the number of subjects that can be examined in one day.
(2) In the present embodiment, a bias voltage of at most 1 V is applied to the semiconductor detector 14 to facilitate recombination of electrons and holes resulting from polarization in the semiconductor member of the semiconductor detector 14. This avoids the polarization and recovers energy resolution, detection efficiency, and photoelectric conversion rate.
(3) The present embodiment uses the filter capacitor 13 to apply a bias voltage to the semiconductor detector 14. The use of the filter capacitor 13 makes it possible to remove noise, thus improving the energy resolution and time resolution.
(4) In the present embodiment, the photo MOS relay 17 is used as a switch that switches the circuit in charging the filter capacitor 13 or discharging a current from it. The photo MOS relay 17 has a high maximum voltage to make it possible to minimize a leakage current. Besides the photo MOS relay, a photo relay, a photo coupler, or the like may be used.
(5) In the present embodiment, the charge current flows through the current regulated diode 15 before reaching the filter capacitor 13. The discharge current from the filter capacitor 13 flows through the current regulated diode 16. By installing the current regulated diodes 15 and 16 in the bias application circuit, it is possible to limit the temporal change in the voltage at the filter capacitor 13 during charging and discharging. This makes it possible to prevent an excessive current from flowing to the amplifier 21. The amplifier 21 can thus be prevented from being damaged.

Embodiment 2

Figure 3:
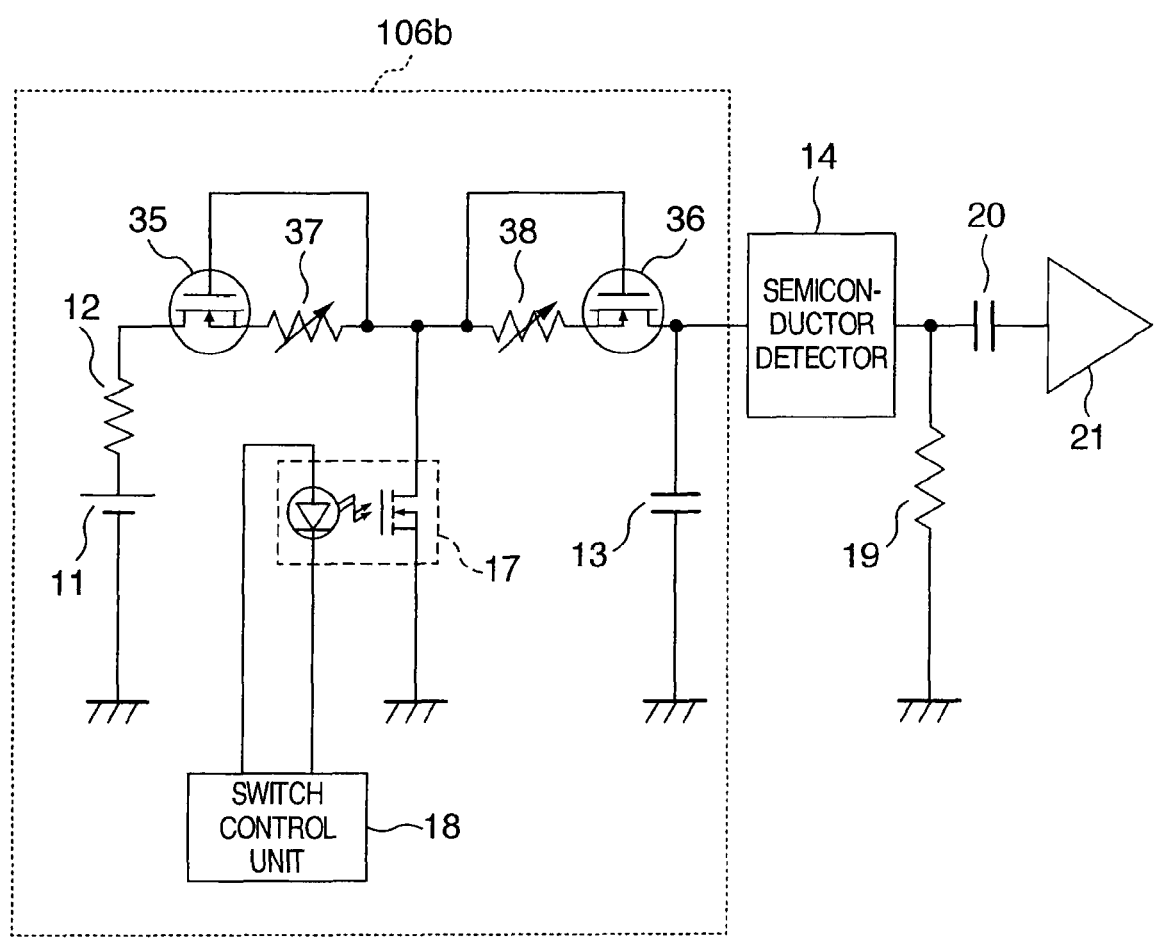
FIG. 3 is a circuit diagram showing a bias application circuit in a PET apparatus in accordance with another embodiment of the present invention.
Figure 4:
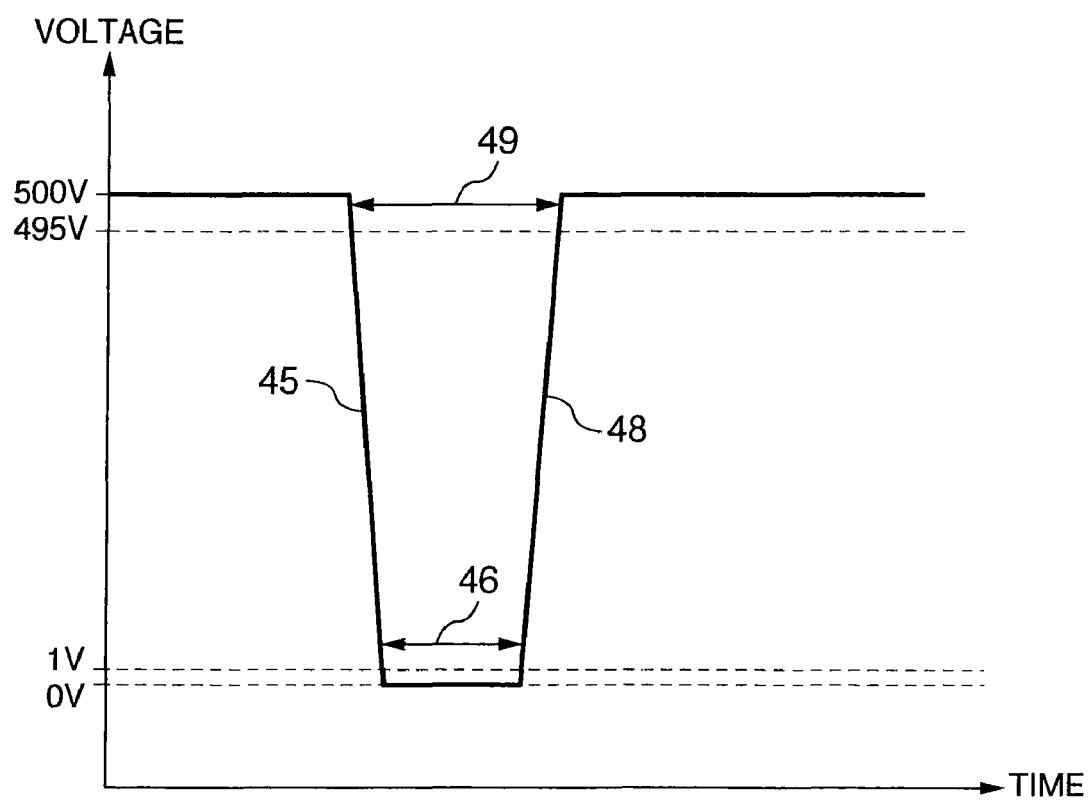
FIG. 4 is a graph showing a temporal change in a voltage applied to the semiconductor detector shown in FIG. 3.

With reference to FIGS. 3 and 4, description will be given of a PET apparatus in accordance with another embodiment of the present invention.

A PET apparatus 90A in accordance with the present embodiment has the same structure as that of the PET apparatus 90 in accordance with Embodiment 1 except for a bias application circuit 106b replacing the bias application circuit 106a.

The bias application circuit 106b will be described with reference to FIG. 3. The bias application circuit 106b has the same structure as that of the bias application circuit 106a in accordance with Embodiment 1 except for a MOS-FET 35 and a variable resistor 37 which replace the current regulated diode 15 of the bias application circuit 106a and a MOS-FET 36 and a variable resistor 38 which replace the current regulated diode 16 of the bias application circuit 106a. The protective resistor 12, MOS-FET 35, variable resistor 37, variable resistor 38, and MOS-FET 36 are connected to the power source 11 in this order by wiring. A drain of the MOS-FET 36 is connected to the power source 11 via the protective resistor 12 by wiring. The variable resistor 37 is connected to a source of the MOS-FET 36 by wiring. A drain of the MOS-FET 36 is connected to one electrode of the semiconductor detector 14 by wiring. One terminal of the filter capacitor 13 is connected to a wire connecting the drain of the MOS-FET 36 to the electrode of the semiconductor detector 14. The variable resistor 38 is connected to the source of the MOS-FET 36 by wiring. The gates of the MOS-FETs 35 and 36 are connected to a wire connecting the variable resistors 37 and 28 together. One terminal of the photo MOS relay 17 is connected to a wire connecting the variable resistors 37 and 38 together. The switch control unit 18 is connected to the photo MOS relay 17 to controllably open and close the photo MOS relay 17. The terminals of the filter capacitor 13 and photo MOS relay 17 are connected to the ground line.

The control method for avoiding polarization and the operation of the switch control unit 18, and the like according to the present embodiment are similar to those of Embodiment 1, and their description is thus omitted.

With reference to FIG. 4, description will be given of a temporal change in the voltage applied to the semiconductor detector 14 if the bias voltage circuit 106b is used to apply a bias voltage to the semiconductor detector 14. The capacitances of the filter capacitor 13 and coupling capacitor 20 and the regulated current value of the amplifier 21 are the same as those in the embodiment shown in FIG. 1. The regulated current value of the MOS-FETs 35 and 36 is 1.0 milliampere. Adjusting the resistance value of the variable resistor 37 enables the adjustment of the decrease rate of, that is, a temporal change (45 in FIG. 4) in, the voltage during discharging from the filter capacitor 13. Adjusting the resistance value of the variable resistor 38 enables the adjustment of the increase rate of, that is, a temporal change (48 in FIG. 4) in, the voltage during charging of the filter capacitor 13. If the photo MOS relay 17 is closed, the filter capacitor 13 is charged via the MOS-FET 35 and variable resistor 37. The bias voltage applied to the semiconductor detector 14 thus becomes 500 V. When the photo MOS relay 17 is closed, electric charges accumulated in the filter capacitor 13 flow to the ground potential via the MOS-FET 36 and variable resistor 38, and 0.05 seconds later, the voltage at the filter capacitor 13 reaches 1 V or lower. That is, 0.05 seconds after the photo MOS relay 17 is closed, the voltage applied to the semiconductor detector 14 becomes 1 V or lower. In this case, after a reset time (46 in FIG. 4) of 0.3 seconds elapses the photo MOS relay 17 is opened to start charging the filter capacitor 13. After the start of the charging, 0.1 second is required to set the voltage at the filter capacitor 13 to 495 V. This reduces the measurement off time (49 in FIG. 4) down to 0.4 seconds. Subsequently, a bias voltage of 500 V is applied to the semiconductor detector 14 for three minutes. The resulting gamma rays are measured. The photo MOS relay 17 is then opened to start discharging from the filter capacitor 13. Subsequently, the operation described in the above embodiment is repeated.

As described above, the use of the bias application circuit 106b of the present embodiment makes it possible to reduce the measurement off time, which may result from an attempt to avoid polarization.

In the present embodiment, when the filter capacitor 13 is subjected to charging or discharging, the maximum value of a current flowing through the amplifier 21 is 10 microamperes. This current value is equal to or smaller than the regulated current value. That is, in the present embodiment, the resistance values of the registers 37 and 38 can be arbitrarily changed to adjust a temporal change in the voltage at the filter capacitor 13. Accordingly, the measurement off time can be reduced by temporally changing the voltage to the extent that the amplifier 21 is not damaged.

The present embodiment can exert the effects (1) to (4) of Embodiment 1 as well as the following effects.

(6) In the present embodiment, the charge current to the filter capacitor 13 flows through the MOS-FET 35 and variable capacitor 37. The discharge current from the filter capacitor 13 flows through the MOS-FET 36 and variable capacitor 38. By installing the MOS-FETs 35 and 36 and the variable resistors 37 and 38 in the bias application circuit 106b, it is possible to limit the temporal change in the voltage of the filter capacitor 13 during discharging and charging. This makes it possible to prevent an excessive current from flowing to the amplifier 21. The amplifier 21 can thus be prevented from being damaged.

(7) The present embodiment uses the MOS-FET 35 and variable resistor 37 in place of the current regulated diode 15 in accordance with Embodiment 1 and also uses the MOS-FET 36 and variable resistor 38 in place of the current regulated diode 16 in accordance with Embodiment 1. The combination of the MOS-FET with the variable resistor increases the maximum voltage above that achieved by the current regulated diode. This favorably makes the number of MOS-FETs and variable resistors to be installed in the bias application circuit smaller than that of current regulated diodes to be installed in the bias application circuit. For example, to apply a bias voltage of 500 V to the semiconductor detector 14, it is necessary to install at least five charging current regulated diodes 15 and at least five discharging current regulated diodes 16, that is, at least 10 current regulated diodes in total. A voltage of 500 V can be withstood by the combination of the MOS-FET 35 with the variable resistor 37 and the combination of the MOS-FET 36 with the variable resistor 38. Therefor the circuit is simplified. Although the present embodiment uses the variable resistors 36 and 37, it is possible to predetermine the resistance values and install the corresponding resistors.

Embodiment 3

Figure 5:
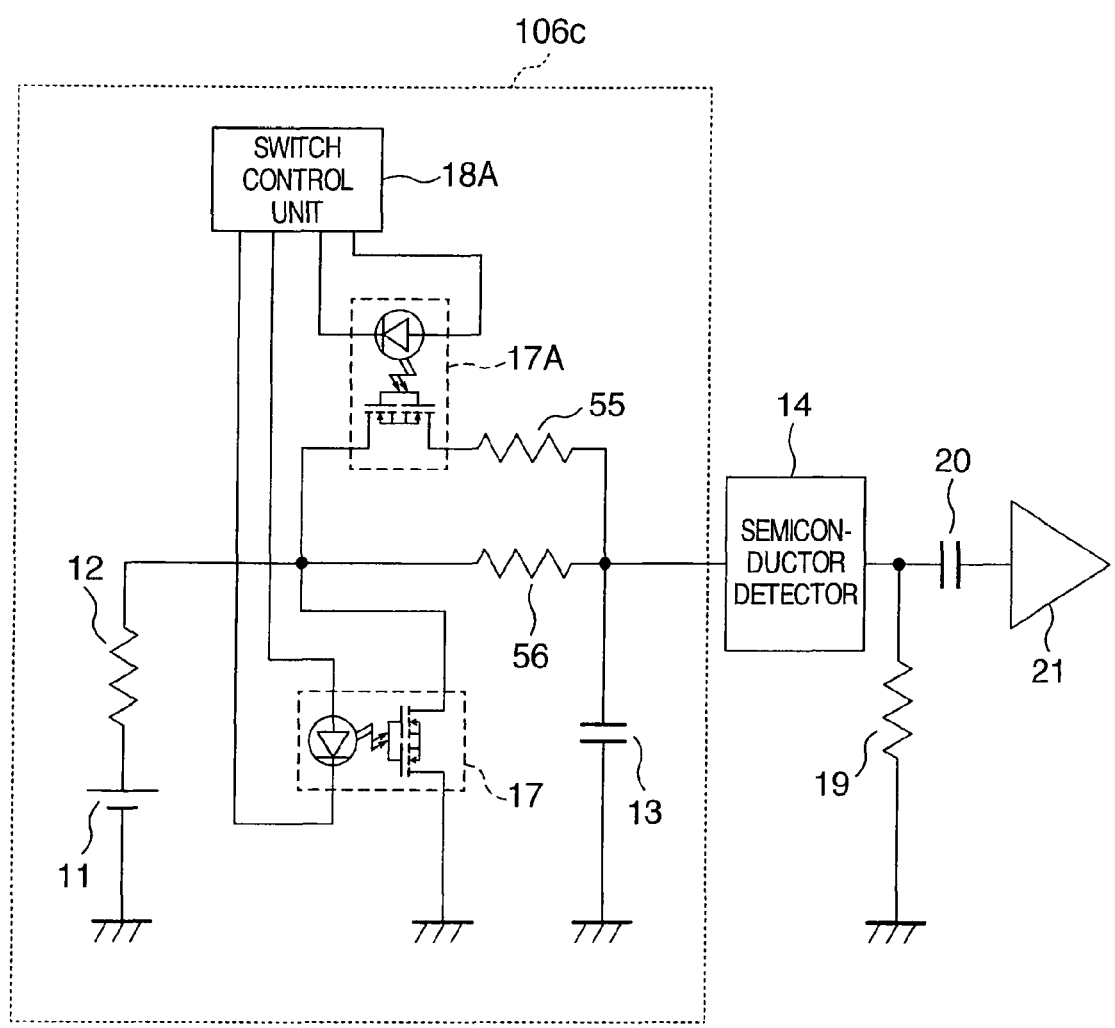
FIG. 5 is a circuit diagram showing a bias application circuit in a PET apparatus in accordance with another embodiment of the present invention.

Now, with reference to FIGS. 5 and 6, description will be given of a PET apparatus in accordance with another embodiment of the present invention.

A PET apparatus 90B in accordance with the present embodiment has the same structure as that of the PET apparatus in accordance with Embodiment 1 except for a bias application circuit 106c replacing the bias application circuit 106a.

The bias application circuit 106c will be described with reference to the drawings. The bias application circuit 106c has the power source 11, the protective resistor 12, the filter capacitor 13, the resistors 55 and 56, the photo MOS replays 17 and 17A, and a switch control unit 18A. The power source 11 is connected to the semiconductor detector 14 via the resistors 12 and 56 by wiring. The filter capacitor 13 is connected to a wire connecting the resistors 55 and 56 to the semiconductor detector 14. One terminal of the photo MOS relay 17 is connected to a wire connecting the resistor 12 to the resistor 56 and photo MOS relay 17A. The photo MOS relay 17A and the resistor 55 are connected together in series and are connected in parallel with the resistor 56. The switch control unit 18A is connected to the photo MOS relays 17 and 17A to controllably open and close the photo MOS relays 17 and 17A. When the photo MOS relay 17A is open, the parallel connection between the resistors 55 and 56 is canceled. When the photo MOS relay 17A is closed, the resistors 55 and 56 are connected together in parallel. The terminals of the filter capacitor 13 and photo MOS relay 17 are connected to the ground line.

The control method for avoiding polarization and the operation of the switch control unit 18 according to the present embodiment are almost similar to those of Embodiment 1. The switch control unit 18 transmits the "open (off)" and "close (on)" instruction signals not only to the photo MOS relay 17 but also to the photo MOS relay 17A also on the basis of the time information stored in another memory (not shown).

Figure 6:
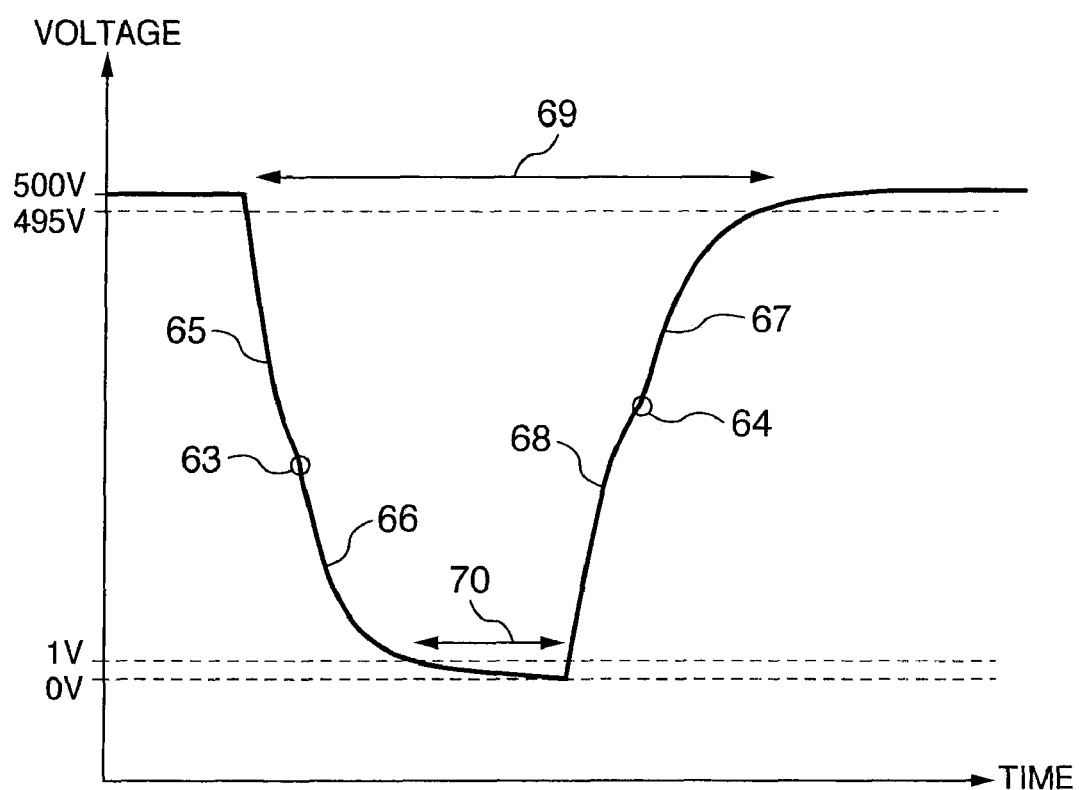
FIG. 6 is a graph showing a temporal change in a voltage applied to the semiconductor detector shown in FIG. 5.

With reference to FIG. 6, description will be given of a temporal change in the voltage applied to the semiconductor detector 14 if the bias voltage circuit 106c is used to apply a bias voltage to the semiconductor detector 14. The capacitances of the filter capacitor 13 and coupling capacitor 20 and the regulated current value of the amplifier 21 are the same as those in the embodiment shown in FIG. 1. The resistance values of the resistors 12, 55, and 56 are 100 kiloohms, 600 kiloohms, and 1 megaohm, respectively. First, while the semiconductor detector 14 is measuring a gamma ray, the photo MOS relay 17 is open, whereas the photo MOS relay 17A is closed. That is, since the resistor 55 is connected to the power source 11 and filter capacitor 13, a charge current flows from the power source 11 through the resistors 55 and 56 to the filter capacitor 13. If the voltage at the filter capacitor 13 is 500 V, the bias voltage applied to the semiconductor detector 14 is correspondingly 500 V. Then, the photo MOS relay 17 is closed, while the photo MOS relay 17A is opened. Opening the photo MOS relay 17A cancels the connection between the resistor 55 and the filter capacitor 13. Charges accumulated in the filter capacitor 13 flow to the ground potential through the resistor 56 and photo MOS relay 17. Then, 0.1 second after the photo MOS relay 17 is closed (point 63 in FIG. 6), the photo MOS relay 17A is closed with the photo MOS relay 17 remaining closed. Then, the resistor 55 is connected to the filter capacitor 13 and photo MOS relay 17. A discharge current flows to the ground potential through the both resistors 55 and 56 from the filter capacitor 13. Connecting the resistor 55 increases the discharge current and thus the rate of a decrease in the voltage at the filter capacitor 13 (66 in FIG. 6), the rate corresponding to a temporal change in the voltage. The voltage at the filter capacitor 13 becomes 1 V or lower 0.3 seconds after the start of discharging from the filter capacitor 13. In other words, 0.3 seconds is required to change the voltage applied to the semiconductor detector 14 from 500 V to 1 V or lower. Subsequently, once a reset time of 0.3 seconds (70 in FIG. 6) elapses, the photo MOS relays 17 and 17A are opened to start charging the filter capacitor 13. A charge current flows to the filter capacitor 13 through the resistor 56. Then, 0.1 second after the start of the charging (point 64 in FIG. 6), the photo MOS relay 17A is closed with the photo MOS relay 17 remaining open. Then, the resistor 55 is connected to the power source 11 and filter capacitor 13. A charge current flows to the filter capacitor 13 through the parallel circuit of the resistors 55 and 56. As in the case of the discharging, connecting the resistor 55 increases the rate of an increase in the voltage at the filter capacitor 13 (67 in FIG. 6), the rate corresponding to a temporal change in the voltage. The voltage at the filter capacitor 13 becomes 495 V or higher 0.27 seconds after the start of discharging from the filter capacitor 13. The present embodiment reduces the measurement off time (70 in FIG. 6) to 0.87 seconds. Subsequently, a bias voltage of 500 V is applied to the semiconductor detector 14 for three minutes. The resulting gamma rays are measured. Then, the photo MOS relay 17 is closed, while the photo MOS relay 17A is opened to start discharging from the filter capacitor 13. Subsequently, the above-described operation of the present embodiment is repeated.

As described above, the use of the bias application circuit 106c of the present embodiment makes it possible to reduce the measurement off time, which may result from an attempt to avoid polarization.

In the present embodiment, during discharging from the filter capacitor 13, the maximum value of a temporal change in the voltage at the filter capacitor 13 is 5,000 V/sec. Since the capacitance of the coupling capacitor 20 is 1,000 picofarads, the maximum value of a current flowing through the amplifier 62 is 5 microamperes. Further, during discharging from the filter capacitor 13, the maximum value of a temporal change in the voltage at the filter capacitor 13 is 4,600 V/sec. Consequently, the maximum value of a current flowing through the amplifier 62 becomes 4.6 microamperes. Thus, the value of the current flowing through the amplifier 62 is sufficiently smaller than its regulated current value.

The present embodiment can also exert the effects (1) to (4) of Embodiment 1.

Embodiment 4

Figure 11:
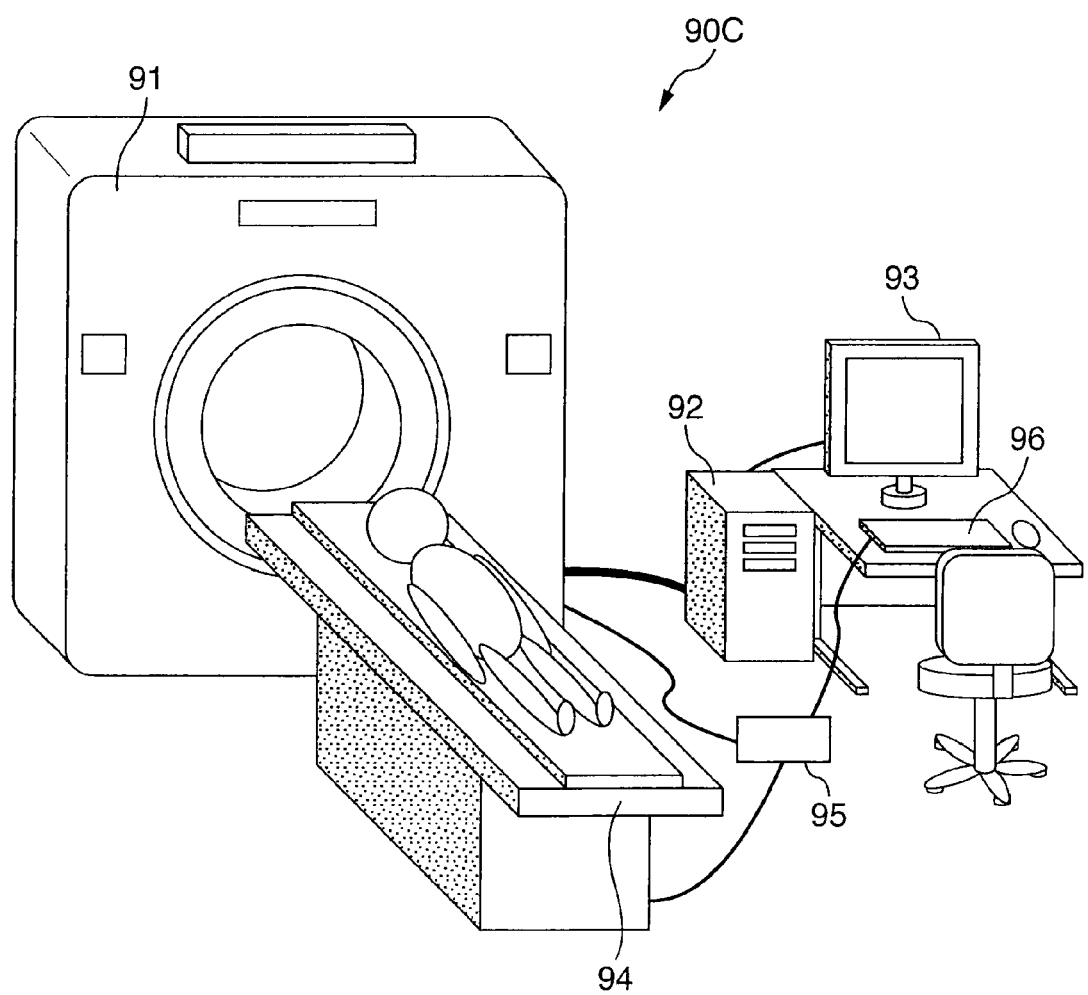
FIG. 11 is a diagram showing the configuration of a PET apparatus in accordance with a preferred embodiment of the present invention.

Now, with reference to FIGS. 1 and 11, description will be given of a PET apparatus in accordance with another embodiment of the present invention.

In the present embodiment, a PET apparatus 90C (not shown) comprises an integral control unit 95, an input unit 96, and the bias application circuit 106a. The PET apparatus 90C also has a charge and discharge control unit including the photo MOS relay 17 and the switch control unit 18.

In the present embodiment, description will be given of the case in which the subject has such a wide examination target range that the entire examination target range cannot be simultaneously imaged (for example, general examinations for cancers).

If the entire examination target range cannot be imaged at a time, a number of areas into which the examination target range is divided must each be imaged by moving the bed 94. Each of the areas into which the examination target range is divided is called a divided target range. For example, a memory of the integral control unit 95 stores information on the subject's examination target range and the number of areas into which the examination target range is divided; an operator (for example, a radiographer) inputs the information using the input unit 96. Further, the time (referred to as a first time below) required to examine one divided target range is also input using the input unit 96 and stored in its memory. For example, if the examination target range for general cancer examinations is 90 cm, the bed 94 is moved nine times after the start of PET examinations. That is, the target range is divided into 10 areas and about 2 to 3 minutes is required to examine one divided target range. A second time is the amount of time after the switch control unit 18 closes the photo MOS relay 17 and the bias application voltage starts to decrease from 500 V and before the photo MOS relay 17 is opened. The second time is stored in the memory of the switch control unit 18.

To start PET examinations, the input unit 96 is operated by the operator to output an examination start signal to the integral control unit 95. Upon receiving the input examination start signal, the integral control unit 95 uses the information on the subject's examination target range to output a bed movement start signal. A bed driving system (not shown) is thus controlled to move the bed 94 so that the first divided target range of the examination target range of the subject is placed in an imaging system 91; the subject lies on the bed 94. When the divided target range is placed in the imaging system 91, the movement of the bed 94 is stopped. In this state, PET examinations are started. Once the first time has passed since the start of the examinations, the integral control unit 95 outputs a bed movement start signal to the bed driving system to move the bed 94 so that the next divided target range is placed in the imaging system 91 as previously described. The bed movement start signal is input to the switch control unit 18. The switch control unit 18 closes the photo MOS relay 17 on the basis of the bed movement start signal. This reduces the bias voltage applied to the semiconductor detector 14 to 1 V or lower as shown in FIG. 2. After the photo MOS relay 17 is closed, when the second time stored in the memory of the switch control unit 18 elapses, the switch control unit 18 opens the photo MOS relay 17. This increases the bias voltage back to 500 V as shown in FIG. 2. The second time is 0.5 seconds and is shorter than the time required to move the bed 94, that is, several seconds. Thus, the polarization of the semiconductor detector 14 can be avoided during the movement of the bed 94. After the movement of the bed 94 is stopped, the second divided target range is subjected to PET examinations. Similarly, PET examinations are repeated for all the divided target ranges. The charge and discharge control unit controls the charging of and discharging from the filter capacitor 13 in synchronism with the movement of the bed 94.

The present embodiment can exert the effects (2) to (5) of Embodiment 1 and the following effect.

(8) The present embodiment applies a reset voltage required to avoid polarization while imaging is not being carried out. This eliminates the measurement off time during the imaging of one subject. The time required for the examinations is thus reduced, thus making it possible to reduce burdens on the subject. It is also possible to increase the number of subjects that can be examined in one day.

The present embodiment has been described in conjunction with the PET apparatus 90C, having the structure of the bias application circuit 106a. The bias application circuit 106b or 106c in accordance with Embodiment 2 or 3, respectively, can also be adapted for the PET apparatus 90C. The bias application circuit 106b makes it possible to exert the effect (8) and the effects (2) to (4) of Embodiment 1. Further, the bias application circuit 106c makes it possible to exert the effect (8) and the effects (2) to (4) of Embodiment 1.

Each of the above embodiments is applicable to a SPECT apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A diagnostic apparatus comprising:
a semiconductor radiation detector that detects a radiation;
a capacitor that applies a voltage to the detector;
a first current regulated unit that conducts a charge current to the capacitor;
a second current regulated unit that conducts a discharge current from the capacitor; and
an opening and closing unit connected to a wire connecting the first current regulated unit and the second current regulated unit together,
wherein the first current regulated unit comprises, on a line through which a charge current flows, a current regulated diode connected in a forward direction with respect to the charge current, which supplies a constant current, and
the second current regulated unit comprises, on a line through which a discharge current flows, a current regulated diode connected in a forward direction with respect to the discharge current, which supplies a constant current.

2. The diagnostic apparatus according to claim 1, wherein a semiconductor crystal member of the semiconductor radiation detector is CdTe.

3. The diagnostic apparatus according to claim 1, wherein the opening and closing unit is a photo MOS relay.

4. A diagnostic apparatus comprising:
a semiconductor radiation detector that detects a radiation;
a capacitor that applies a voltage to the detector;
a first current regulated unit that conducts a charge current to the capacitor;
a second current regulated unit that conducts a discharge current from the capacitor; and
an opening and closing unit connected to a wire connecting the first current regulated unit and the second current regulated unit together,
wherein the first current regulated unit comprises a first MOS-FET and a variable resistor connected between a gate and a source of the MOS-FET, and
the second current regulated unit comprises a second MOS-FET and a variable resistor connected between a gate and a source of the MOS-FET.

5. A diagnostic apparatus comprising:
a semiconductor radiation detector that detects a radiation;
a capacitor that applies a voltage to the detector;
a first current regulated unit that conducts a charge current to the capacitor;
a second current regulated unit that conducts a discharge current from the capacitor; and
an opening and closing unit having the first current regulated unit and the second current regulated unit connected to an input end,
wherein said first and second current regulated units supply a constant current.

6. The diagnostic apparatus according to claim 5, wherein the first current regulated unit comprises a current regulated diode connected in a forward direction with respect to the charge current, and
the second current regulated unit comprises a current regulated diode connected in a forward direction with respect to the discharge current.

7. The diagnostic apparatus according to claim 5, wherein the first current regulated unit comprises a first MOS-FET and a resistor connected to a source of the first MOS-FET, and the second current regulated unit comprises a second MOS-FET and a resistor connected to a source of the second MOS-FET.

8. The diagnostic apparatus according to claim 5, wherein a semiconductor crystal member of the semiconductor radiation detector is CdTe.

9. The diagnostic apparatus according to claim 5, wherein the opening and closing unit is a photo MOS relay.

10. A diagnostic apparatus comprising:
a bed that supports a subject; and
a semiconductor radiation detector that detects a radiation from the subject,
the diagnostic apparatus intermittently moving the bed to detect the radiation,
the diagnostic apparatus further comprising:
a capacitor that applies a voltage to the detector; and
a unit that subjects the capacitor to charging or discharging in synchronism with the intermittent movement of the bed,
wherein a charge unit for the capacitor comprises a first current regulated diode connected in a forward direction with respect to the charge current,
a discharge unit for the capacitor comprises a second current regulated diode connected in a forward direction with respect to the discharge current,
the first and second current regulated diodes supply a constant current, and
an opening and closing unit is connected to a wire connecting the first current regulated diode and the second current regulated diode together.

11. The diagnostic apparatus according to claim 10, wherein a semiconductor crystal member of the semiconductor radiation detector is CdTe.

12. The diagnostic apparatus according to claim 10, wherein the opening and closing unit is a photo MOS relay.

13. A diagnostic apparatus comprising:
a bed that supports a subject; and
a semiconductor radiation detector that detects a radiation from the subject,
the diagnostic apparatus intermittently moving the bed to detect the radiation,
the diagnostic apparatus further comprising:
a capacitor that applies a voltage to the detector; and
a unit that subjects the capacitor to charging or discharging in synchronism with the intermittent movement of the bed,
wherein the charge unit for the capacitor comprises a first MOS-FET and a resistor connected to a source of the MOS-FET,
the discharge unit for the capacitor comprises a second MOS-FET and a resistor connected to a source of the MOS-FET, and
the opening and closing unit is connected to a wire connecting the first resistor and the second resistor together.

14. The diagnostic apparatus according to claim 13, wherein a semiconductor crystal member of the semiconductor radiation detector is CdTe.

15. The diagnostic apparatus according to claim 13, wherein the opening and closing unit is a photo MOS relay.

16. A diagnostic apparatus comprising:
a semiconductor radiation detector that detects a radiation;
a capacitor that applies a voltage to the detector;
a first resistor that conducts a charge current to and a discharge current from the capacitor;

a second resistor connected in parallel with the first resistor to subject the capacitor to charging and discharging;

a first opening and closing unit connected in series with the second resistor; and a second opening and closing unit connected to a wire connecting the first resistor and the first opening and closing unit together, said first opening and closing unit being independent of said second opening and closing unit.

17. The diagnostic apparatus according to claim 16, wherein the second resistor is connected in parallel with the first resistor during a latter half of a charge time during which the capacitor is charged and during a latter half of a discharge time during which the capacitor is subjected to discharging.

18. The diagnostic apparatus according to claim 16, wherein a semiconductor crystal member of the semiconductor radiation detector is CdTe.

19. The diagnostic apparatus according to claim 16, wherein the opening and closing unit is a photo MOS relay.

20. A power supply unit for a diagnostic semiconductor radiation detector, the power supply unit comprising:

a DC voltage source;

a filter capacitor for the semiconductor radiation detector which detects a radiation from a subject;

a first current regulated unit that conducts a charge current from the DC voltage source to the capacitor;

a second current regulated unit that conducts a discharge current from the capacitor; and an opening and closing unit connected to a wire connecting the first current regulated unit and the second current regulated unit together, wherein the first current regulated unit comprises, on a line through which a charge current flows, a current regulated diode connected in a forward direction with respect to the charge current, which supplies a constant current, and the second current regulated unit comprises, on a line through which a discharge current flows, a current regulated diode connected in a forward direction with respect to the discharge current, which supplies a constant current.

21. A power supply unit for a diagnostic semiconductor radiation detector, the power supply unit comprising:

a DC voltage source;

a filter capacitor for the semiconductor radiation detector which detects a radiation from a subject;

a first current regulated unit that conducts a charge current from the DC voltage source to the capacitor;

a second current regulated unit that conducts a discharge current from the capacitor; and an opening and closing unit connected to a wire connecting the first current regulated unit and the second current regulated unit together, wherein the first current regulated unit comprises a first MOS-FET and a variable resistor connected between a gate and a source of the MOS-FET, and the second current regulated unit comprises a second MOS-FET and a variable resistor connected between a gate and a source of the MOS-FET.

22. A power supply unit for a diagnostic semiconductor radiation detector, the power supply unit comprising:

a DC voltage source;

a filter capacitor for the semiconductor radiation detector which detects a radiation from a subject;

a first resistor that conducts a charge current to and a discharge current from the capacitor;

a second resistor connected in parallel with the first resistor to subject the capacitor to charging and discharging;

a first opening and closing unit connected in series with the second resistor; and a second opening and closing unit connected to a wire connecting the first resistor and the first opening and closing unit together, said first opening and closing unit being independent of said second opening and closing unit.

* * * * *